United States Patent [19]

Akers et al.

[11] 4,200,207

[45] Apr. 29, 1980

[54] HOT MELT ADHESIVE FOAM PUMP SYSTEM

[75] Inventors: Larry D. Akers; Charles H. Scholl, both of Vermilion, Ohio

[73] Assignee: Nordson Corporation, Amherst, Ohio

[21] Appl. No.: 874,333

[22] Filed: Feb. 1, 1978

[51] Int. Cl.² .......................... F04C 1/14; F04C 15/04
[52] U.S. Cl. .................................... 222/190; 222/255; 222/318; 417/250; 417/253; 417/428; 418/9; 418/15
[58] Field of Search .............. 417/250, 253, 428, 503; 418/9, 15; 222/252, 255, 190, 146 HE, 383, 318

[56] References Cited

U.S. PATENT DOCUMENTS

| | | |
|---|---|---|
| 2,918,009 | 12/1959 | Crevoisier .............................. 418/15 |
| 3,119,339 | 1/1964 | Clarke et al. ....................... 418/15 X |
| 3,628,893 | 12/1971 | Carpigiani .............................. 418/15 |
| 3,964,645 | 6/1976 | Scholl ............................. 222/146 HE |
| 4,009,974 | 3/1977 | Scholl ..................................... 418/181 |
| 4,059,466 | 11/1977 | Scholl et al. ,.................. 222/146 HE |
| 4,059,714 | 11/1977 | Scholl et al. ............. 222/146 HE X |

Primary Examiner—David A. Scherbel
Attorney, Agent, or Firm—Wood, Herron & Evans

[57] ABSTRACT

A hot melt adhesive foam pump system having a first stage pump that meters molten hot melt adhesive into a second stage pump, which in turn mixes gas under pressure into the adhesive so that the gas is driven into solution with the adhesive at an adjustably controllable ratio. The pump is insensitive to changes in adhesive viscosity and pump speed, and provides uniformity of foam density and output flow rate when the adhesive is ejected from a dispenser connected to the pump.

20 Claims, 18 Drawing Figures

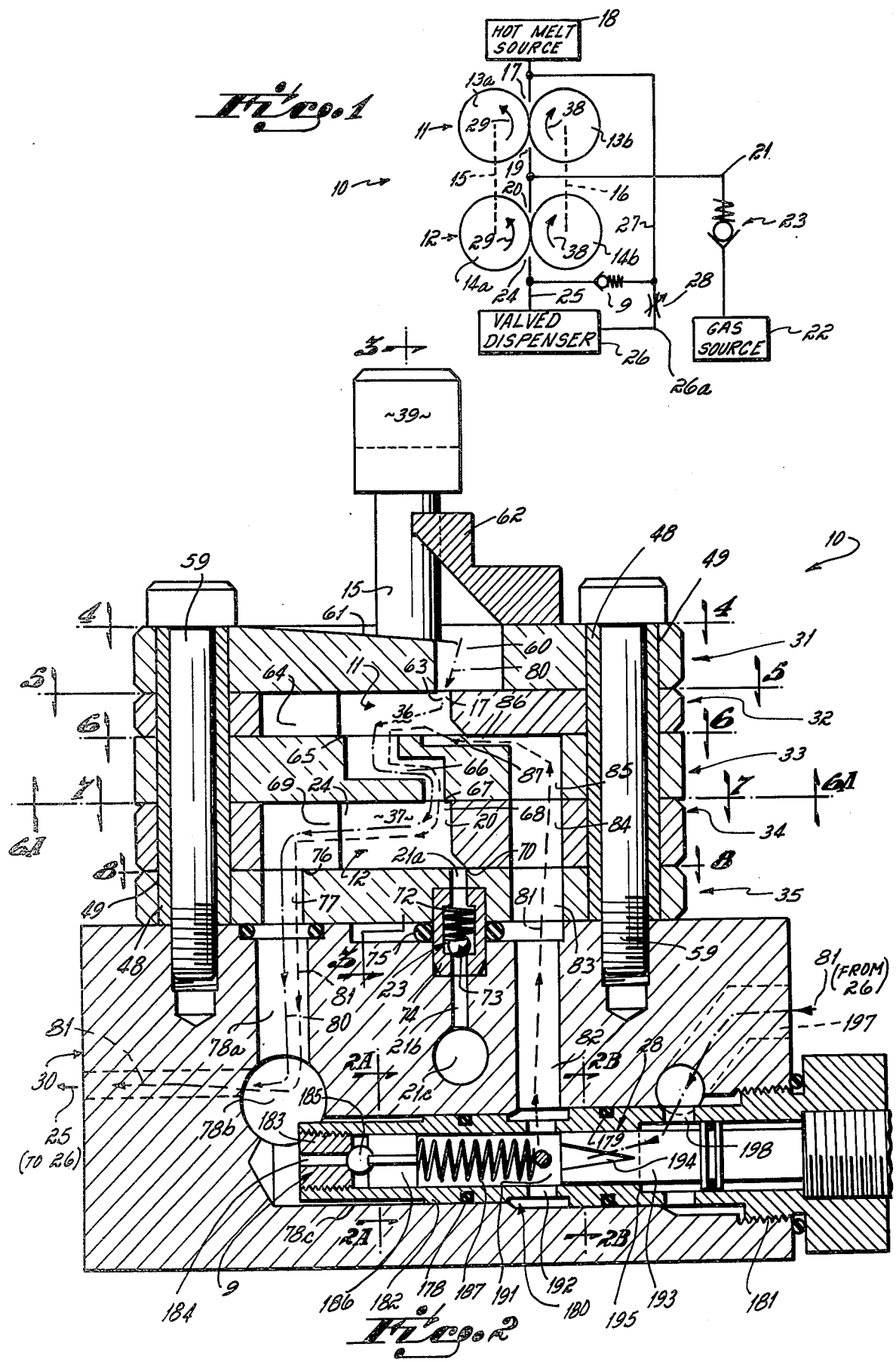

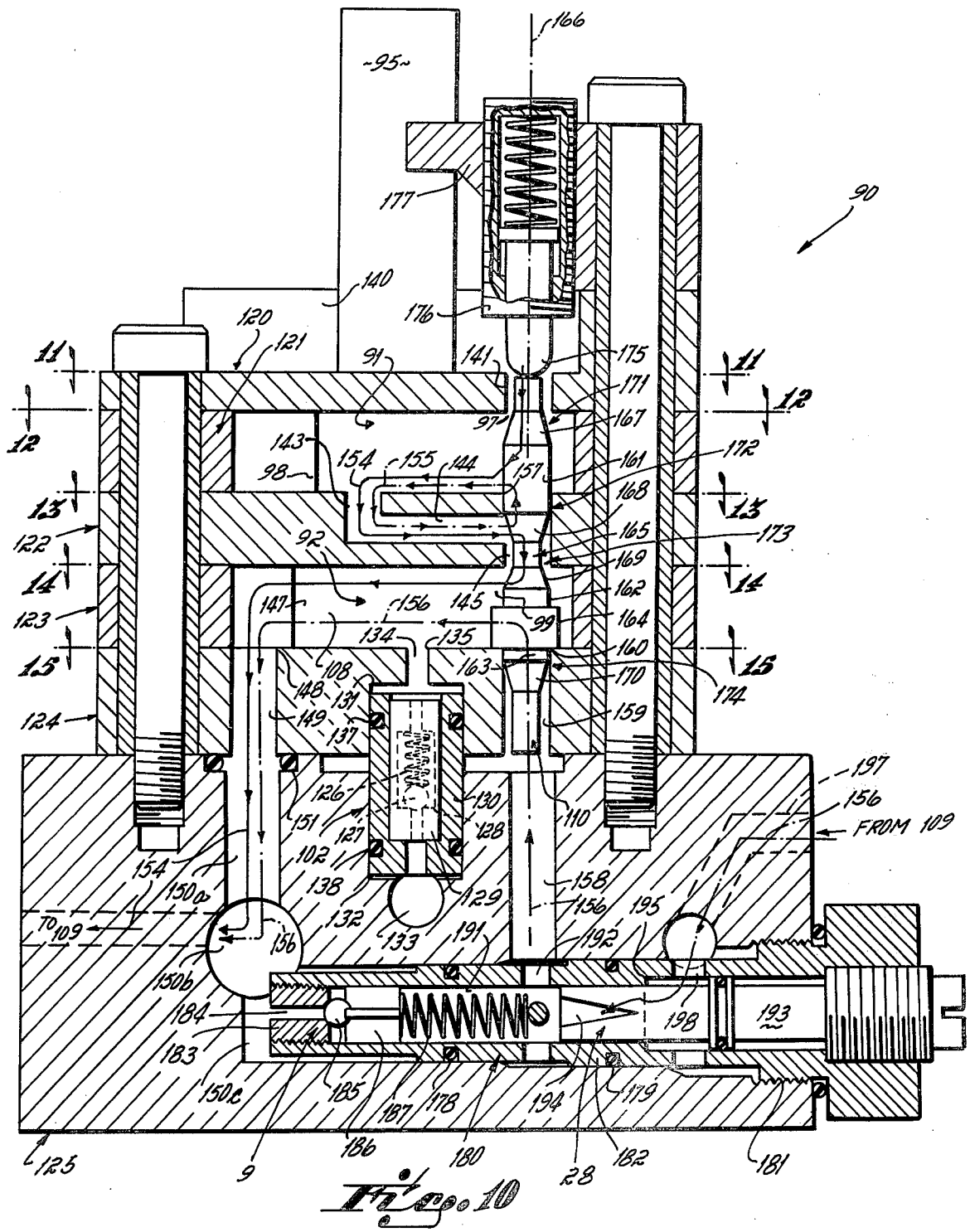

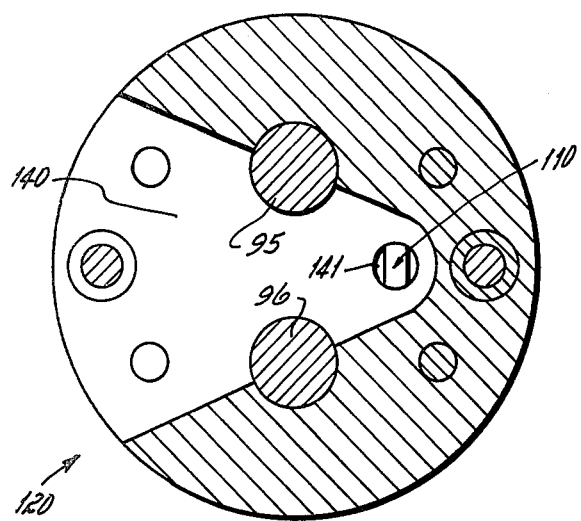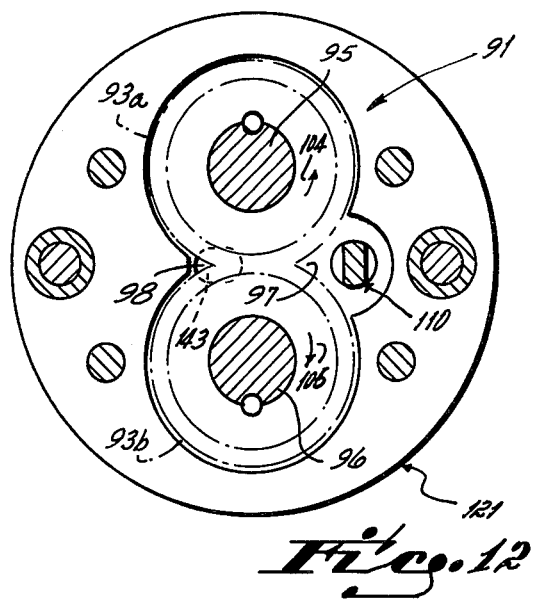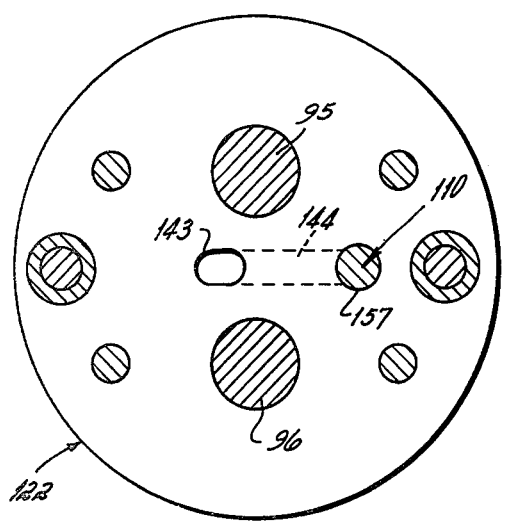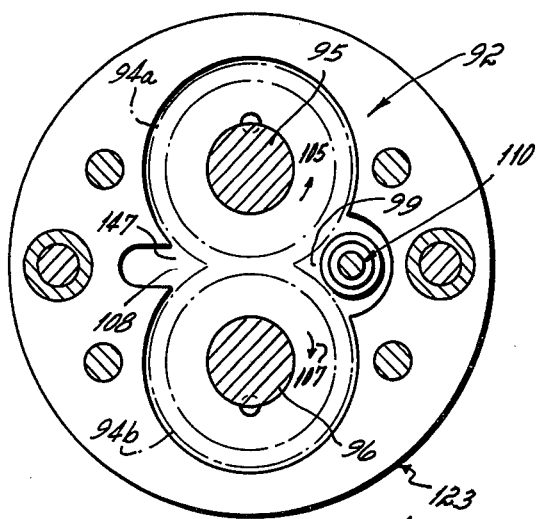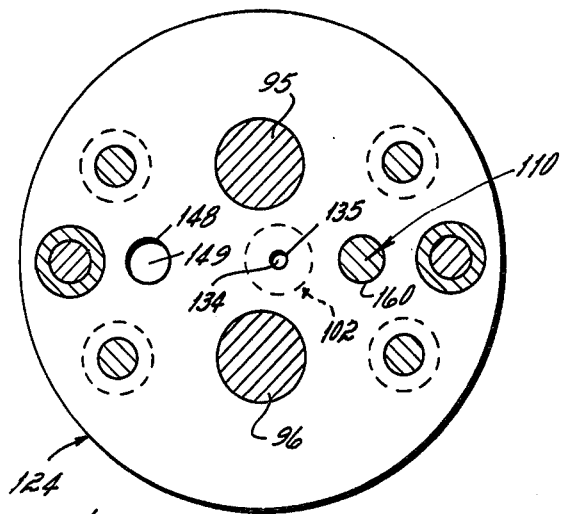

HOT MELT ADHESIVE FOAM PUMP SYSTEM

The invention relates to hot melt adhesive foam systems. More particularly, this invention relates to a novel hot melt adhesive foam pump for use in such a system.

Hot melt adhesives are widely used throughout industry for adhering substrates one with another in many diverse applications. One of the most common uses of such adhesives is in the packaging and cartoning industries, where the quick setting time of hot melt adhesives is particularly advantageous. In this end use, a common problem is the difficulty of compressing hot melt adhesive after application so as to obtain sufficient "squeeze out" of the adhesive between the substrates, to achieve a good bond of adequate surface area. The relatively high viscosity, high surface tension, and quick setting time of many hot melt adhesives tend to restrain liquid adhesive from spreading over as large a substrate surface area as is desirable. Instead of spreading, the deposited liquid sets up as a thick bead on the structure. Even when quickly compressed, as for example between two flaps of a carton, the adhesive is difficult to spread. When two adhered surfaces are pulled apart, it is generally found that it is the substrate which fails, rather than the adhesive to substrate interface. Consequently, the greater the area of interface or surface contact between the adhesive and the substrate, the stronger the bond will be.

It has recently been discovered that the adhesive strength of a bond achieved with a given quantity of a selected hot melt adhesive may be appreciably improved, and in most instances at least doubled, if the adhesive is applied as a cellular foam rather than in the conventional way as a non-foamed adhesive. The increased bonding strenght of the foamed adhesive results at least in part from the fact that the adhesive foam may be spread over at least twice the area, under the same compressive conditions, as an equal mass of adhesive which has not been foamed. Hot melt adhesive foam also has been found to have a longer "open" time, after it has been deposited onto a first substrate and during which it can effectively bond to a second substrate when pressed against it, yet it has a shorter "tack time", i.e., it will set up and adhere faster after it has been compressed between two substrates. These characteristics together are particularly desirable in cartoning applications. There is no need to close flaps immediately after applying foamed adhesive onto one of the flaps. Also, "pop opening" is very substantially reduced, and the adhered surfaces may be released from clamping pressure soon after application of that pressure. These discoveries are disclosed in Scholl et al U.S. Pat. No. 4,059,714, issued Nov. 22, 1977, entitled "Hot Melt Thermoplastic Adhesive Foam System," and in Scholl et al U.S. Pat. No. 4,059,466, also issued Nov. 22, 1977, entitled "Hot Melt Thermoplastic Adhesive Foam System", both of which are assigned to the assignee of this application.

As shown in those patents, in producing a hot melt adhesive foam, if a gas such as air or nitrogen at high pressure, for example 300 pounds per square inch, is thoroughly mixed with liquid hot melt adhesive, the gas can go into solution in the adhesive. When the adhesive/gas solution is subsequently dispensed, as from a conventional valved type of adhesive dispenser or gun, the gas will come out of solution but remains entrapped in the adhesive, to form a closed cell hot melt adhesive foam having the desirable adhesive characteristics described above.

In one preferred embodiment of the technique described in U.S. Pat. No. 4,059,714, solid thermoplastic adhesive material is heated and melted in a reservoir and the molten adhesive is introduced jointly with a gas, e.g., air, to a single stage gear pump. Within the gear pump the gas and liquid adhesive are mixed, and the gas is forced into solution with the molten liquid adhesive. The liquid/gas adhesive solution, under pump outlet pressure, is then supplied to a valved type of adhesive dispenser from which the adhesive can selectively be dispensed at atmospheric pressure. Upon emerging from the outlet nozzle of the dispenser, the gas evolves from the solution in the form of small bubbles causing the adhesive to expand volumetrically to form a hot melt adhesive foam. The resultant adhesive foam, if left in an uncompressed state, would set up as a homogeneous foam having air or gas cells evenly distributed throughout, and it has the desired adhesive characteristics mentioned above.

It is important for certain applications that the flow from the valved dispenser or gun be very smooth and of uniform rate, and that there be no significant "spitting" or "sputtering" from the gun nozzle. Such spitting may cause discrete foam droplets to splatter onto the substrate over an uncontrolled area, with reduced or no foam application at the intended position. Spitting can be particularly undesirable in those applications where a gun is rapidly and repetitively "cycled", or valved on and off, for example as in applying a "stitched" adhesive pattern onto carton flaps.

Moreover, we have found it to be important that the density of the foam, as deposited on the substrate, should be uniform with time, regardless of whether the dispenser is open for a relatively long period of time or whether it is rapidly cycled on and off. Further, the foam density and deposition rate should remain uniform regardless of melt temperature variations and pump speed variations. There is, of course, a certain amount of tolerance in foam deposition which is acceptable in commercial use, but it is important that the foam density remain within that tolerance regardless of the mode in which a particular gun is operated, i.e., regardless of whether it is continuously on or is cycled.

We have also found that under some conditions there may be an undesirable delay, or "run-in" period, after the gun is triggered but before the adhesive is delivered from the nozzle. While this may be insignificant in some applications, e.g., where a gun will remain on for relatively long periods, we have found that run-in can be undesirable where a gun is cycled on and off. Particularly in the latter case, it is an important criteria of operation that, when the gun is cycled on, the adhesive foam be emitted immediately (as a practical matter), in a uniform state and at a steady rate.

Accordingly, it has been the primary objective of this invention to provide an improved hot melt adhesive foam pump adapted to deliver a solution of gas in hot melt adhesive on a highly reliable and continuous basis, with minimal variation in the volume and density of the foam adhesive output from a valved dispenser and with minimal spitting or sputtering, thereby to increase the uniformity of the adhesive foam. It has been another objective to provide an improved hot melt adhesive foam pump capable of providing a molten adhesive/gas solution that permits a reliable and uniform adhesive foam to be ejected from a valved dispenser connected to the pump with no "run-in" time, so that foam delivery, after activation of the dispenser valve is almost instantaneous.

In accord with these objectives, the improved hot melt adhesive foam pump of this invention includes a first stage pump that functions to meter liquid hot melt adhesive into a second stage pump, and the second stage pump functions to admix a gas into solution with the metered hot melt adhesive. In a preferred form, the first and second stage pumps are gear pumps and are driven at the same rate by a single power unit. The gas is added in the second stage, preferably into the cavities between the gear teeth where the gears come out at a point after the respective cavities of mesh, and more preferably still have received a measured volume of liquid hot melt. Means are provided for partial or total recycling of the molten adhesive/gas solution through one or both stages of the pump in the event a valved dispenser connected to the pump is partially or fully closed.

Other objectives and advantages of this invention will be more apparent from the following detailed description taken in conjunction with the drawing in which:

FIG. 1 is a diagrammatic illustration of a first embodiment of an improved adhesive foam dispensing system in accord with the principles of this invention;

FIG. 2 is a cross sectional view taken axially of the first embodiment of the improved adhesive foam pump;

FIG. 10 is a cross sectional view taken axially of the second embodiment of the improved adhesive foam pump;

FIG. 11 is a cross sectional view taken along line 11—11 of FIG. 10;

FIG. 12 is a cross sectional view taken along line 12—12 of FIG. 10;

FIG. 13 is a cross sectional view taken along line 13—13 of FIG. 10;

FIG. 14 is a cross sectional view taken along line 14—14 of FIG. 10; and

FIG. 15 is a cross sectional view taken along line 15—15 of FIG. 10.

Figure 3:
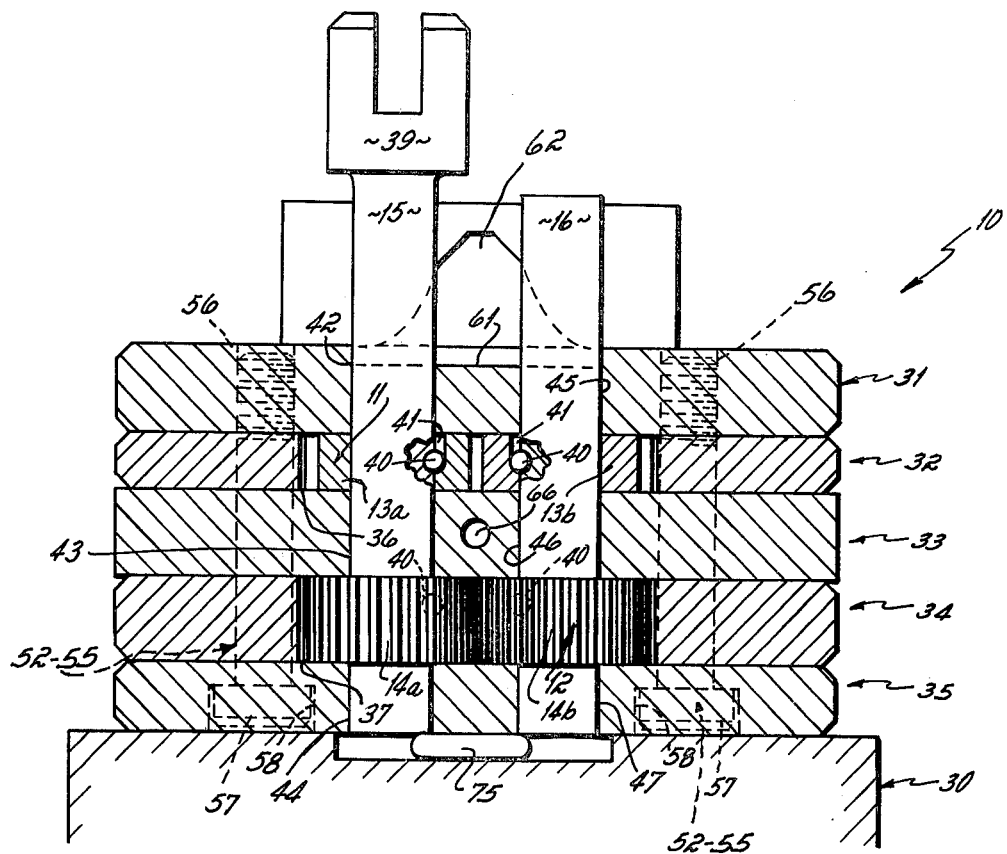
FIG. 3 is a cross sectional view taken along line 3—3 of FIG. 2.

The first embodiment of the improved hot melt adhesive foam dispensing system and pump, in accord with the principles of this invention, is illustrated in FIGS. 1-8. As shown in diagrammatic form in FIG. 1, the improved system of this invention includes a two-stage gear pump 10 having a first stage 11 and a second stage 12, each stage comprising oppositely rotating and meshed gear pairs 13a and b, and 14a and b respectively. The driven gears 13a, 14a of each stage are connected by a common drive shaft 15, and the idler gears 13b, 14b of each stage are connected by common idler shaft 16. Molten hot melt adhesive is introduced, for example at atmospheric pressure, into low pressure side 17 of the first stage pump 11 from a hot melt source 18. A preferred hot melt adhesive source for use with the improved pump of this invention is illustrated in Scholl U.S. Pat. No. 4,009,974, entitled "Method and Apparatus for Pumping Viscous Material" and assigned to the assignee of this application. The adhesive is delivered at the outlet side 19 of first pump 11 at a metered rate, and from there is introduced into inlet side 20 of the second stage pump. A gas, e.g., air, nitrogen or carbon dioxide, is also introduced into inlet 20 of second stage pump 12, through a gas line 21 from a gas source 22 which may for example be at a pressure in the range of about 1–45 psi. Gas inlet line 21 includes a check valve 23 that prevents back flow of molten adhesive from the first stage pump's outlet side 19 through that line 21 toward the gas source 22.

The gas and molten adhesive are intimately admixed in second stage pump 12, which places them under such pressure that the gas goes into solution with the molten adhesive, thereby providing the molten adhesive/gas solution previously discussed. This solution is ejected from the outlet side 24 of second stage pump 12 through a line 25 to a valved adhesive dispenser 26, e.g., a gun or the like. One valved dispenser structure which may be used with the pump of this invention is illustrated in U.S. Pat. No. 4,059,714, previously referred to. A recycle line 27 is provided between the outlet side 24 of second stage pump 12 and the inlet side 17 of first stage pump 11. This recycle line includes a relief valve 9 therein, for recycling a part or all of the adhesive/gas solution if the system pressure exceeds the relief setting of valve 9. A variable restrictor 28 in the return hose or line 26a from dispenser 26 restricts the recycle flow during cycling of a gun.

In effect, first stage pump 11 meters and delivers molten hot melt adhesive to the inlet side 20 of second stage pump 12. It stabilizes the second stage against viscosity changes and motor speed changes. The second stage pump 12 functions as a mixing device for intimately admixing and pressurizing into solution the metered molten hot melt adhesive from first stage pump 11 with the gas infeed from source 22. It has been found that the combination of a first stage metering pump 11 with the second stage mixing pump 12 provides a more uniform adhesive/gas solution output, and that this in turn enhances the reliability and continuity of the adhesive foam output from the valved dispenser 26. In other words, this pump 10 structure improves the mixing of the adhesive and gas and insures that the foam dispensed will be very uniform and virtually free from spitting and sputtering.

More particularly, and with specific reference to FIGS. 2-8, the first embodiment of the improved adhesive foam pump 10 of this invention includes a series of specially configured plates stacked on top of, and connected to, a manifold block 30. As shown in FIG. 2, the pump 10 includes an inlet end plate 31, a first stage pump plate 32, a center port plate 33, a second stage pump plate 34, and an outlet end plate 35, all of generally the same peripheral configuration and size, and all stacked one on top of the other.

Figure 5:
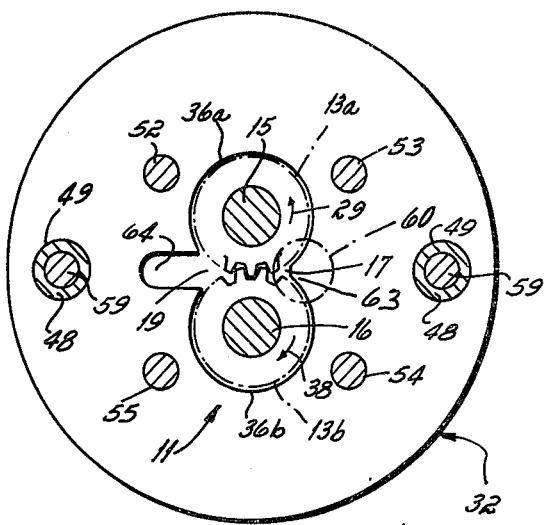
FIG. 5 is a cross sectional view taken along line 5—5 of FIG. 2.
Figure 7:
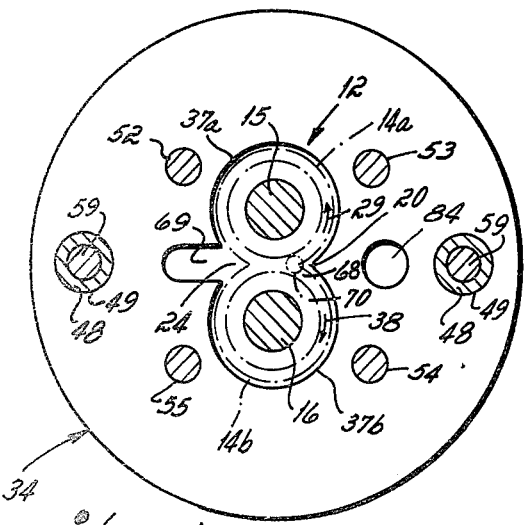
FIG. 7 is a cross sectional view taken along line 7—7 of FIG. 2.

First stage pump plate 32 defines a pair of partially overlapping circular gear cavities 36a, 36b, which receive a first pair of meshed gears 13a, 13b, as shown in FIG. 5. The second stage or mixing pump plate 34 defines a second pair of partially overlapping gear cavities 37a, 37b, which receive a second pair of meshed gears 14a, 14b, as illustrated in FIG. 7. Note that in this embodiment the gears of both pairs have the same number of teeth, but the gears 14 of second stage pump 12 are thicker than those of the first stage pump. Since the gears of both stages rotate at the same rate, the second stage pump 12 has a displacement greater than that of the first stage. This ratio controls the maximum density of the foam that is ultimately produced; lesser densities are produced as gas pressure is increased, because a greater mass of gas will then be compressed in the intertooth cavities of the second stage, in relation to a given mass of liquid adhesive from the first stage. Preferably the displacement ratio of the second stage to the first stage should be in the range of about 1.25-2; a 1.5 ratio is preferred. By way of specific example, the gears of both pairs may be 1.25" in pitch diameter, have 20 teeth, and be rotated at a speed of about 200 to 800 rpm. The gears of the first stage may be 0.200" thick and the gears of the second stage 0.300" thick, which establishes a difference in displacement of 1.5 to 1. The volume of gas delivered to the second stage from source 22 fills the additional displacement volume of the second stage, i.e., the volume which is in excess of the volume of hot melt received therein.

One gear 13a, 14a of each stage is a drive gear, and the other gear 13b, 14b is an idler gear. The drive gears are connected by shaft 15, which has a connector end 39 for coupling to a drive (not shown). The first and second stage drive gears are connected to shaft 15 by keys 40 received in key-ways 41, see FIG. 3. Shaft 15 extends through bearing bores 42-44 in plates 31, 33 and 35. The two idler gears 13b, 14b are connected by a common idler shaft 16, which idler shaft extends through bearing bores 45-47 in the inlet end plate 31, center port plate 33 and outlet end plate 35, respectively. The idler gears 13b, 14b may be connected to the idler shaft 16 in the same fashion as the drive gear 13a, 14a are connected to the drive shaft 15, namely, by a ball 40 and slot 41 keyway structure. Note the drive 15 and idler 16 shafts are parallel. In assembly, therefore, rotation of the drive shaft 15 causes simultaneous and equal rotation of the first 13 and second 14 stage gear pairs, the rotation direction 29 of the drive gears 13a, 14a of the pairs being the same, and the rotational direction 38 of the idler gears 13b, 14b of the pairs being the same and opposite to that rotational direction of the drive gears, all as illustrated in FIG. 1.

The pump's plates 32-35 are retained in aligned stacked relation by four bolts 52-55 (see FIGS. 3-8) received therethrough and into threaded bores 56 in the inlet end plate 31, the heads 57 of those bolts being received in seats 58 provided in the end plate 35. Throughbolts 59 pass through positioner sleeve 48 in plate bores 49, and are threaded into tapped bores in the manifold block 30, see FIG. 2, to mount the preassembled plates 31-35 to the manifold block.

Figure 4:
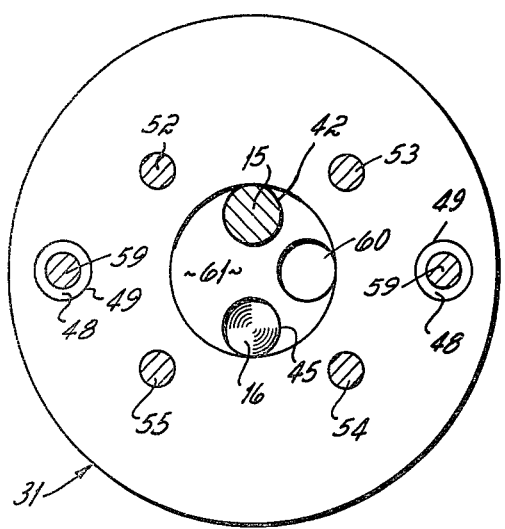
FIG. 4 is a cross sectional view taken along line 4—4 of FIG. 2.
Figure 6:
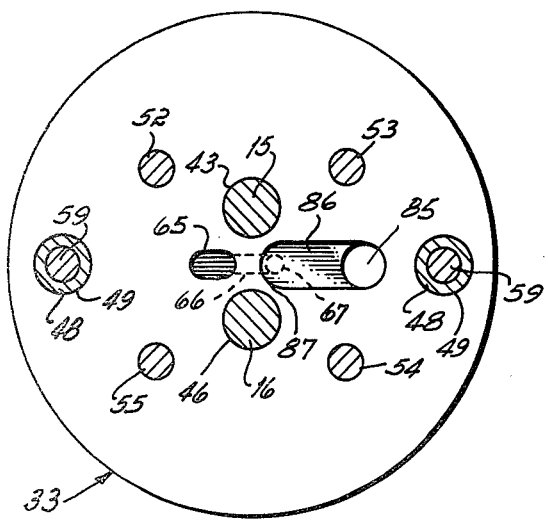
FIG. 6 is a cross sectional view taken along line 6—6 of FIG. 2.
Figure 6A:
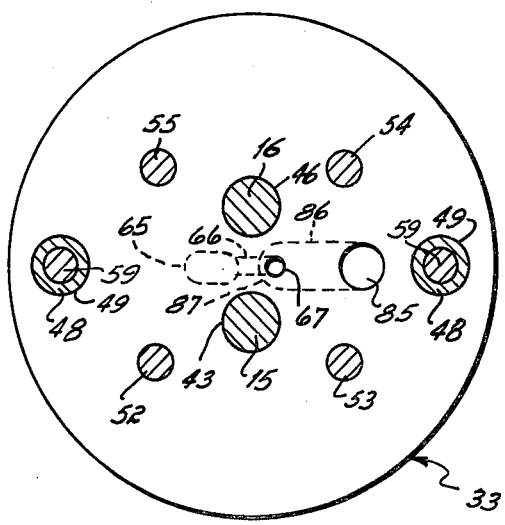
FIG. 6A is a cross sectional view taken along line 6A—6A of FIG. 2.
Figure 8:
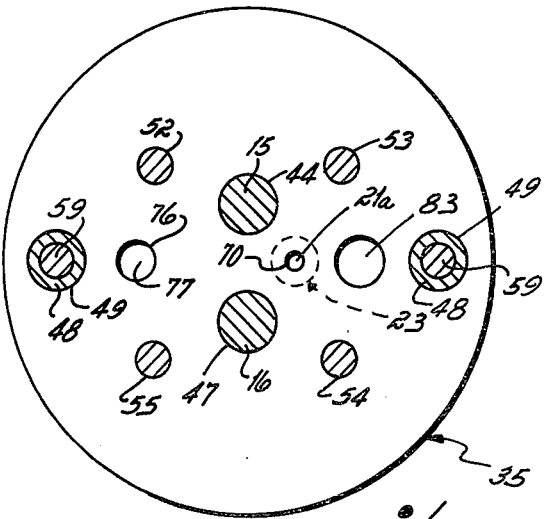
FIG. 8 is a cross sectional view taken along line 8—8 of FIG. 2.

The porting of the first pump 10 embodiment is illustrated particularly in FIGS. 2 and 4-8. As shown in FIGS. 2 and 4, the inlet port plate 31 provides a first stage hot melt inlet port 60 therethrough, that inlet port cooperating with an angled infeed throat 61 defined in the top surface of that port plate. A hood 62 is disposed on top the inlet port plate 31 to aid in directing the molten hot melt adhesive inflow into the first stage inlet port 60, as shown in U.S. Pat. No. 4,009,974 previously identified. Inlet port 60 opens into first stage hot melt inlet zone 63, where the gears come out of mesh, as illustrated in FIG. 2 and in phantom lines in FIG. 5. The first stage pump plate 32 also includes a first stage outlet zone 64, from which the metered molten hot melt adhesive is directed into intermediate transport port structure 66 defined in the center port plate 33, see FIGS. 2, 6 and 6A. The intermediate transfer port structure directs metered molten adhesive from outlet side 19 of first stage pump 11 to inlet side 20 of second stage pump 12. This intermediate transfer port structure includes first stage hot melt out port 65, first to second stage transfer bore 66, and second stage hot melt in port 67, all defined in center port plate 33. The metered molten adhesive from first stage pump 11 is thereby introduced into second stage pump 12 from the top side thereof, as shown particularly in FIG. 2. The second stage pump plate 34 (FIG. 7) further defines a second stage hot melt "in" zone 68 and a second stage "out" zone 69. The molten adhesive/gas solution outlet 76 of the second stage pump 12 is illustrated at FIGS. 2 and 8. The outlet port 76 cooperates with an outlet throughbore 77 in outlet end plate 35, and that outlet throughbore 77 connects the second stage outlet port 76 with discharge bores 78a-78c in the manifold block 30. The discharge bore section 78b in the manifold block is connected with the valved adhesive dispenser 26.

A gas in introduced into inlet side 20 of second stage pump 12 from the bottom side thereof through gas inlet port 70, see FIGS. 2 and 8. The gas is directed to this gas inlet port 70 through a check valve 23 and gas feed through bores 21a-21c, the feed bores being connected with a gas source 22 and the check valve preventing backflow of molten adhesive from the second stage pump into gas feed bores 21b, 21c upstream of that check valve. Check valve 23 includes a ball 73 urged by a spring 72 onto a seat, and is received in fitting 74 captured between outlet end plate 35 and manifold block 30, as shown in FIG. 2. An O-ring seal 75 is provided around fitting 74 between outlet end plate 35 and manifold block 30.

It is to be noted, in FIGS. 7 and 8, that the molten adhesive from the first stage is fed by port 68 into the second stage gear inter-tooth spaces or cavities before those spaces pass the gas inlet port 21a, 70. The sequence of first admitting the molten adhesive into the respective tooth cavities, and then completing the filling of the remaining volume of the cavity with the gas, has been found to insure that the cavities will recieve the adhesive and gas at the intended ratio. Filling first (or simultaneously) with gas, because of its compressibility, may result in a gas "bubble" which resists entry of the liquid into the particular gear tooth pocket, and thereby may lead to foam inhomogeneity.

The primary flow path, through the pump, of molten hot melt adhesive and of molten adhesive/gas solution once that solution is admixed in the second stage pump 12, is illustrated by phantom arrow 80 and leads to bore 78b in the manifold block which is use in connected to a gun. However, a recycle flow path is also provided by which a portion of all of the molten adhesive/gas solution can be recycled back through the pump 10 from the gun, into the first stage pump's inlet side 17, as illustrated by dotted arrow 81 in FIG. 2. (This dotted path 81 corresponds to the recycle path 25, 26, 26a, 28 and 27 in FIG. 1.) For this purpose, recycle passages are provided in first stage pump plate 32, center port plate 33, second stage pump plate 34, outlet end plate 35 and manifold block 30. As shown in FIGS. 2 and 5-8, this recycle porting includes a recycle bore 82 in the manifold block 30 that connects bore 78c with a recycle throughbore 83 in outlet end plate 35. Recycle throughbore 83 in outlet plate 35 connects with a recycle throughbore 84 in second stage pump plate 34. Recycle throughbore 84 in second stage pump plate 34 connects with a recycle bore 85 defined in center port plate 33, and this bore 85 in center port plate 33 opens into a lateral passage 86 defined between first stage pump plate 32 and center port plate 33, see FIGS. 2, 6 and 6A. The recycle boring 82-86 connects with inlet side 17 of first stage pump 11, from the bottom surface of first stage pump plate 32 at a recycle inlet port 87, see FIGS. 2 and 6, for introducing recycle flow of molten adhesive/gas solution from outlet 24 of second stage pump 12 into hot melt inlet zone 63 while feed molten adhesive (not in solution) is added to the recirculated material in Zone 63.

Figures 2A, 2B, 9:
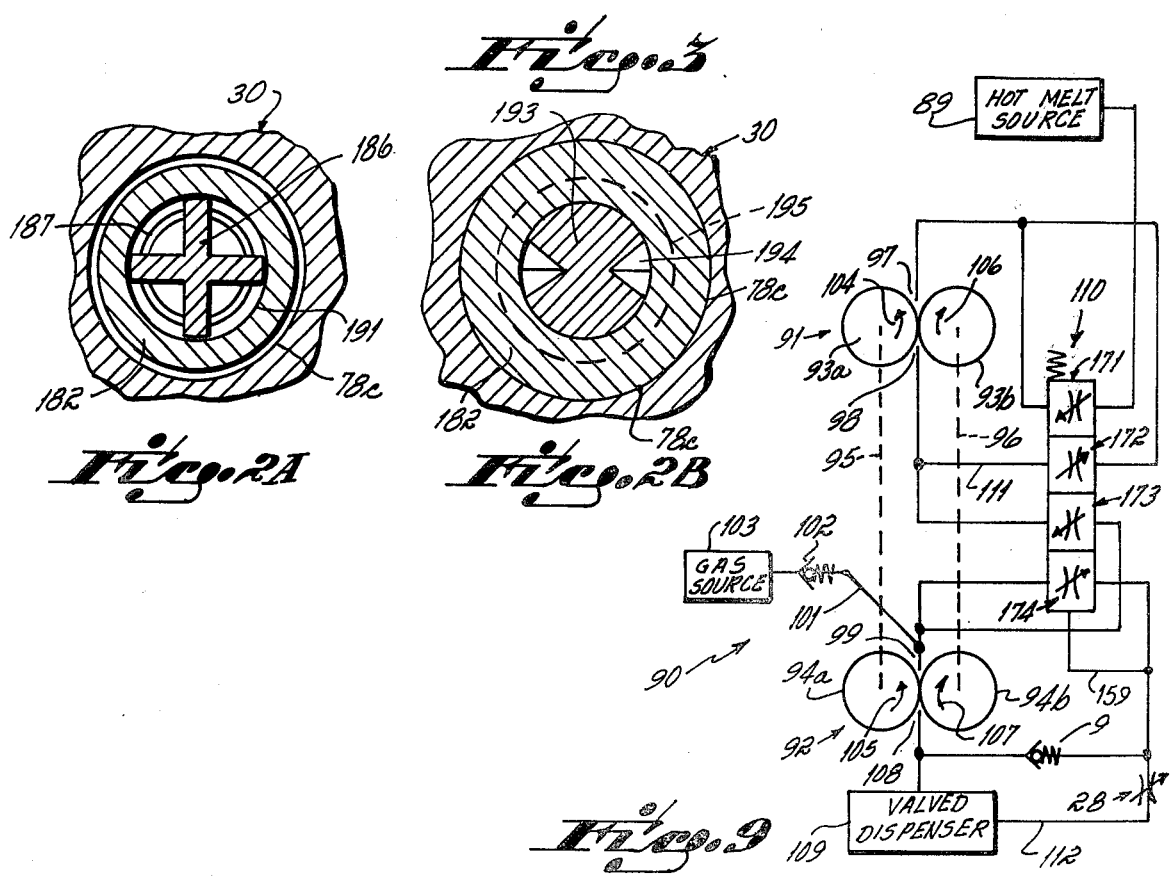
FIG. 2A is an enlarged fragmentary sectional view, taken on line 2A—2A of FIG. 2.
FIG. 2B is an enlarged fragmentary sectional view, taken on line 2B—2B of FIG. 2.
FIG. 9 is a diagrammatic illustration of a second embodiment of an improved adhesive dispensing system in accord with the principles of this invention.

The pressure relief valve indicated at 9 in FIG. 1 may be incorporated as part of circulation valve structure designated generally at 180 in FIG. 2 which is received in bore 78c of manifold 30. This circulation valve structure includes an outer sleeve 182 which is threaded into bore 78c at 181. A relief vavle seat 183 is secured at the inner end of sleeve 182, i.e., at its leftmost end in bore 78c as seen in FIG. 2. Seat 183 has an axial port 184 on which is seated a ball 185. Ball 185 is biased against port 184 by a guide 186 having a cruciform shape, see FIG. 2A, which is in turn acted upon by a spring 187. Ball 185 is thereby biased toward its seat 184 to form the check valve 29.

Sleeve 182 is sealed with respect to bore 78c by O-rings 178 and 179 around it. An internal chamber 191 inside sleeve 182 opens through the sleeve wall via radial ports 192 into communication with recycle bore 82 of the manifold. In the even of excessive pressure buildup within the hoses or the dispenser, a high pressure condition will exist at bore 78b. This condition will be relieved by opening of the ball check valve 184, 185 so that fluid can flow through bore 184, the interior 191 of sleeve 182, and radial ports 192 to recycle bore 82.

As indicated diagrammatically in FIG. 1, return line 26a from valved dispenser 26 includes a variable restrictor 28. Preferably, as shown in FIG. 2, this variable restrictor 28 is also included as part of the circulation valve structure 180. More specifically, an adjustable valve member 193 is axially positionable in the interior of sleeve 182 to the right of ports 192. Valve member 193 presents a notch or groove 194 at its inner end, this groove having a V-shape as seen in section, see FIG. 2b, which forms a valve with a shoulder 195 in sleeve 182. Notch 194 can be positioned axially with respect to shoulder 195 by threading valve member 193 into or out of the sleeve, to control the area of the valve opening. A lock nut, now shown, is provided to secure the member 193 with respect to sleeve 182.

Manifold block 30 includes a gun return passage 197, which corresponds to line 26a shown diagrammatically in FIG. 1. This passage 197 communicates with shoulder 195 through radial ports 198 in sleeve 182. Together, notch 194 and shoulder 195 form the variable restrictor 28 in the hose return line 26a which communicates through ports 192 with recycle bore 82. The axial position of valve member 193 with respect to shoulder 195 thus controls the proportion of flow that will be recycled.

In use of the first embodiment 10 of the improved adhesive foam pump, when pump 10 is operating molten hot melt adhesive is introduced through port 60 in inlet port plate 31 into first stage pump 11, via flow path 80. The hot melt adhesive entering the first stage pump may be at ambient pressure. The molten adhesive infeed is metered by the first stage pump and transferred through porting 65-67 in center port plate 33 to inlet 20 of second stage pump 12. The gas is introduced in second stage pump 12 just after introduction of the metered molten adhesive from first stage pump 11. The pressure at which the gas is introduced will control the density of the foam; pressures in the range of approximately 1-45 psig have already been used. The second stage pump 12 mixes the adhesive and gas to provide, under pressure, a molten adhesive/gas solution which is exhausted from the outlet side 24 of the second stage pump, into the discharge bore 78a of manifold block 30. When valved dispenser 26 is full open, i.e., when it is discharging adhesive, relief valve 9 restricts recycle flow of the solution along recycle flow path 81. When the valved dispenser is closed, i.e., when no adhesive foam is being dispensed, the pressurized adhesive/gas solution recycles through valve 28, sleeve interior 191, recycle bore 82 in the manifold block 30, through recycle bores 83-85 of outlet end plate 35, second stage pump plate 34, and center port plate 33, through passage 86 back to inlet side 17 of first stage pump 11. As can be seen from FIG. 5, when recycling occurs, the recycled solution is introduced immediately at the point where gears 13a and b begin to come out of mesh. The spaces between the teeth are filled with recycle material; the feed material flowing from the molten adhesive source makes up the additional requirement to fill the spaces between the gear teeth. Thus, in this first embodiment, the recycled solution flows through both the first and second pump stages 11 and 12.

A second embodiment of the improved adhesive foam pump and system, also in accord with the principles of this invention, is illustrated in FIGS. 9-15. The pump 90 of the second embodiment includes a first stage 91 and a second stage 92. The first 91 and second 92 stage pump drive gears 93a, 94a are mounted on a common shaft 95, and are driven by a power unit (not shown). The first 91 and second 92 stage pump idler gears 93b, 94b are mounted on a common idler shaft 96 and mesh with the respective drive gears 93a, 94a. The pump's drive gears 93a, 94a turn in the same rotational direction, as indicated by arrows 104, 105 and the idler gears 93b, 94b rotate in the opposite rotational direction as indicated by arrows 106, 107.

Molten hot melt adhesive is supplied to the inlet side 97 of first stage pump 91 from molten adhesive source 89 through a variable restrictor or valve 171. When the valved dispenser 109 is fully open, the first stage's metered output is delivered from first stage outlet side 98 through a variable restrictor valve 173 to the inlet side 99 of second stage pump 92. Gas is introduced to inlet side 99 of the second stage pump through gas line 101, a check valve 102 being provided in line 101 to prevent adhesive flow back through the line toward gas source 103. The second stage pump admixes the molten adhesive output from the first stage pump's outlet side 98 with the gas to provide a pressurized adhesive/gas solution at the outlet side 108 for transfer to one or more valved dispensers 109. (This pump 90 is particularly adapted for serving multiple valved dispenser outlets, e.g., multiple guns.) A first stage recycle path 111 connects the outlet 98 of the first stage to the inlet 97 via a variable restrictor or valve 172. Similarly, a second stage recycle path 112 connects the outlet side 108 of that stage to the inlet 99 of that stage, via a variable restrictor or valve 174.

The second embodiment pump 90 differs from the first embodiment pump, among other respects, in the provision of proportioning valve means for proportionately relating the recycle flows in paths 111 and 112 to the first and second stages respectively. The proportioning valve means, which is designated generally at 110 in FIG. 10, includes a spool which forms a part of each of the valves 171-174. When all the dispensers of a multidispenser system are open, the proportioning valve 110 operates to block all recycle flow. When at least one but less than all the multiple dispensers is closed, proportioning valve 110 splits the first stage's output (prior to dissolving the gas) between the recycle path 111 and the second stage. In doing this, valve 171 is partially closed and valve 172 is partially opened to establish the recycle path 111 through the first stage pump. At the same time, valve 110 also operates to permit a similar proportion of the output of the adhesive/gas solution from the second stage to recycle within the second stage pump 92. It throttles or partially closes valve 173 and partially opens valve 174, thus establishing the second recycle path 112 through the second stage pump only. In opening recycle valves 172 and 174, spool 110 simultaneously tends to close valves 171 and 173. Thus, valves 171-174 are operated by the proportioning valve 110 to establish a separate recycle path 111 or 112 for each pump stage, and to establish the same proportion of recycle flow to total flow in each stage.

In the situation where all valved dispensers 109 are closed, all of the molten adhesive delivered from the transfer port, first stage pump 91 is recycled back to the inlet side 97 of that first stage pump, and all of the adhesive/gas solution delivered from second stage pump 92 is recycled back to the inlet side 99 of that second stage pump. In this full recycle attitude, the valve 110 simultaneously blocks the molten adhesive inlet port from the source to the first stage pump 91, and simultaneously blocks the transfer of molten adhesive from the first stage pump 91 to second stage pump 92.

The pump 90 of the second embodiment further differs from the first embodiment pump 10 in that the gears of the second stage have the same thickness as those of the first stage, but the gears of the second stage have a larger displacement area by reason of a greater diametral pitch and fewer teeth.

By way of specific example, in the second embodiment the gears of both stages may be 0.250" thick and 0.75" pitch diameter, with the gears of the first stage having 24 teeth and those of the second stage having 16 teeth. It will be noted that the 24/16 tooth ratio establishes a 1.5 displacement differential or ratio; the same preferred ratio as was established in the first embodiment by thickness ratio. Tooth number ratio and gear thickness ratio are thus alternative ways of controlling maximum foam density.

The second embodiment pump 90 includes an inlet end plate 120, a first stage pump plate 121, a center port plate 122, a second stage pump plate 123, and an outlet end plate 124, all secured together, assembled with first 93 and second 94 stage gear pairs therein, and connected with drive 95 and idler 96 shafts in the same manner as previously described in respect to the first embodiment pump 10. However, because of the proportioning valve 110, the porting of the various plates 120-124 of the second embodiment pump 90 is significantly different from the porting of the first embodiment pump plates, as will be described. The manifold block 125 of the second pump embodiment 10 may be similar to manifold block 30 of the first pump embodiment, and includes similar circulation valve structure 180 with a check valve 9 and a restrictor 28.

The check valve assembly 102 for gas inlet line 101 is somewhat different in this second embodiment pump 90, although it serves the same purpose. Here the check valve assembly includes a spring 126 biasing a valve ball 127 in a chamber 128 defined by an inlet 129 received in a fitting 130. Fitting 130 is captured between a recess 131 in outlet end plate 124 and a recess 132 in manifold block 125. Check valve assembly 102 opens at its upstream end into gas feed bore 133 (which is interconnected with gas source 103) in manifold block 125, and opens at its downstream end into gas discharge bore 132 in outlet end plate 124. The gas discharge bore 134 leads to the gas inlet port 135 that opens into the second stage pump, see FIGS. 10, 14 and 15. The check valve's fitting 130 is provided with O-rings 137, 138 which seal with outlet end plate 124 and manifold block 125.

The porting of the pump's plates 120-124 in this second embodiment, as previously mentioned, is different from the porting in the first embodiment. Inlet end plate 120, as illustrated in FIGS. 10 and 11, includes a feed throat 140 for directing molten adhesive from adhesive source 89 into first stage hot melt inlet port 141. Molten adhesive flow through port 141 flows into a first hot melt inlet 97 in first stage pump plate 121, as shown in FIGS. 10 and 12. Port 141 enters where the gears are just coming out of mesh, i.e., at what is the inlet side of the first stage pump 91 by reason of the rotational direction 104, 106 of the pump gears 93, as shown in FIG. 12. The outlet side 98 of first stage pump 91 feeds a port 143 defined in port plate 122 below the first stage pump plate 121, as illustrated in FIGS. 10 and 13. The molten hot melt adhesive at port 143 is directed through a first-to-second stage transfer bore 144 in center port plate 122, and passes from that transfer bore 144 through second stage melt entrance port 145 (see FIG. 10) into the second stage hot melt inlet 99 in second stage pump plate 123, see FIGS. 10 and 14.

The adhesive/gas solution formed in second stage pump 92 is delivered to its outlet side 108 as defined by second stage hot melt out chamber or zone 147 in second stage pump plate 123, see FIGS. 10 and 14. From there, the molten adhesive/gas solution passes through a second stage hot melt outlet port 148 into an outlet bore 149 defined in outlet end plate 124 as shown in FIG. 15. Outlet port 148 and outlet bore 149 connect with discharge bores 150a-150c in the manifold block, the manifold block being retained in sealed relation with outlet end plate 124 by O-ring 151, see FIG. 10. The manifold block's discharge bore section 150 is interconnected with one or more valved dispensers 109 through hosing or the like, as described in relation to the FIG. 1 system.

Valve 110 of the second embodiment pump 90 and its associated porting are illustrated in FIGS. 10-15. In effect, two recycle flow paths are defined in the second embodiment pump, the first recycle path circling only first stage pump 91, as illustrated by phantom loop 155 in FIG. 10 (analogous to the recycle loop 111 of FIG. 9), and the second recycle path circling the second stage pump only, as illustrated by phantom loop 156 (analogous to the recycle loop 112 of FIG. 9). The first recycle path 155 is through first stage hot melt outlet port 143, first-to-second stage transfer bore 144, and a first stage recycle port 157 in center port plate 122. The second recycle path 156 is through bores 149 and 150a and b to the dispenser 109, back from the dispenser via passage 197, through restrictor 28 to recycle bore 158 in manifold block 125, and second stage recycle bore 159 and port 160 in plate 124. The first stage recycle port 157 opens into inlet zone 97 of first stage pump 91, and second stage recycle port 160 opens into inlet zone 99 of second stage pump 92.

Proportioning valve 110 includes four individual valve means. A spool designated generally by 165 forms the movable valve member for each valve, having lands 161-163 and a stop 164 formed on it. The lands function in valving relation with ports or passages 141, 157, 145 and 160 respectively. More specifically, shifting spool 165 moves land 161 between a first position shown in FIG. 10, whereat the land closes first stage recycle port 157, and a second position (not shown) whereat the land closes first stage hot melt inlet port 141. Land 162 is moved between an open position shown in FIG. 10 and a second position (not shown) whereat it closes second stage hot melt inlet port 145. Third land 163 is moved between a first position shown in FIG. 10 whereat it closes second stage recycle port 160 and an open position (not shown). Stop 164 is moved between a first position, shown in FIG. 10, which locates the spool 165 in the no recycle attitude and a second position (not shown) which locates the spool in the full recycle attitude. In the first position, stop land 164 is seated against the top surface of outlet end port plate 124 and in the second position the stop land is seated against the underside of the center port plate 122.

Movement of spool 165 is longitudinal along its axis 166. A series of tapered or conical sections 167-170 are formed on the spool adjacent lands 161-163, respectively. Thus land 161, adjacent tapered section 167 forms valve 171 with port 141, and adjacent section 168 forms valve 172 between transfer bore 144 and inlet 97. Land 162 adjacent tapered section 169 forms valve 173 with port 145 below bore 144, see FIG. 10. Land 163, adjacent tapered section 170, forms valve 174 with bore 159. The lands 161-163 are all of the same diameter to seal with the bores in which they move; stop 164 is larger in diameter.

Bias means in the form of a spring loaded plunger 175 is mounted to the pump housing to bias spool 165 toward the no-recycle position shown in FIG. 10. Plunger 175 is slidably received in casing 176 and is continuously biased downwardly by a spring. The plunger's casing 176 is adjustably threaded into an arm 177 projecting from inlet end plate 120. Note the plunger 175 is movable longitudinally and is coaxially aligned with axis 166 of spool 110. Preferably, the spring within the spring loaded plunger establishes a biasing force corresponding to a relatively low recycle pressure, e.g., 200-250 psig.

In use, plunger 175 urges spool 165 downwardly so that stop 164 abuts the top face of the outlet end plate 124. This opens flow path 154 and fully closes recycle flow paths 155, 156. When multiple dispensers are used and all are open, the pump will thus be in the attitude illustrated in FIG. 10, with the flow being along path 154. In this full open attitude, fresh molten hot melt adhesive is introduced into the first stage gear pump 91 through first stage hot melt inlet port 141, and from the first stage pump through transfer bore 144 through second stage hot melt inlet port 145 into the second stage 92 at inlet side 99 thereof. Gas is introduced into second stage through gas inlet port 135. The second stage pump 92 admixes the molten hot melt adhesive and gas into solution form, and discharges same through port 148 into bore 150a of manifold block 125. With all adhesive dispensers open and dispensing adhesive foam, no back pressure buildup is expected to occur, and there is ordinarily no recycling.

When one or more but less than all valved dispensers 109 are closed, the pressure in manifold block 125 rises and acts against the end area of spool 165, against the bias of spring loaded plunger 175, and shifts the spool upwardly. Land 163 moves away from closing relation with second stage recycle port 160, partially opening that port to recycle flow. By the same movement of spool 165, the first stage hot melt recycle port 157 is also partially opened and establishes recycle flow of molten hot melt adhesive within the first stage pump 91. Simultaneously, second stage hot melt inlet port 145 is partially closed to flow from the first stage pump 91 to the second stage pump 92. Also, the hot melt inlet port 141 to first stage pump 91 is partially closed to flow from molten adhesive source 89 to the first stage pump 91. The valves 172 and 174 open in proportion to the amount valves 171 and 173 close. The position of spool 165 is controlled by the pressure in recycle bores 158, 159, once that pressure exceeds the preestablished spring bias on plunger 175. The spool 165 can thus shift between the full open position shown in FIG. 10, and a full closed position established when stop 164 abuts center port plate 122, in response to the recycle flow or back pressure of the adhesive/gas solution, which in turn is responsive to the proportion of adhesive dispensers closed.

When all dispensers are closed, pressure of the adhesive/gas solution output from the second stage pump forces spool 165 upwardly against the bias of spring loaded plunger 175 until stop 164 abuts center port plate 122. In this attitude valves 174 and 172 are full open. At the same time, valves 171 and 173 are closed, thereby completely sealing first stage pump 91 from second stage pump 92. This permits molten hot melt adhesive within the first stage pump to be recycled therein along recycle flow path 155, independently of the adhesive/gas solution being recycled through the second stage pump 92 along recycle flow path 156.

Throughout this specification and claims, the term "solution" has been used to describe the molten liquid adhesive/gas dispersion supplied under high pressure which, when dispensed from a dispenser at atmospheric pressure, will provide a foamed adhesive. It is believed this mixture is a true solution in which the gas is molecularly dispersed in the liquid adhesive. However, as used in the specification and the claims hereof, the term is intended to encompass the broader concept of a gas homogeneously mixed with molten liquid adhesive, whether or not the gas is in fact molecularly dispersed. Further, throughout this specification and claims the phrase "hot melt adhesive" has been used as meaning a solvent-free material which is applied in a molten state.

Having described in detail the preferred embodiment of the invention, what is desired to be claimed and protected by Letters Patent is:

1. A dispensing system for mixing a gas with a liquid and for pumping the resulting mixture to a dispenser comprising,
   first and second stage gear pumps each having an inlet and outlet,
   a passage for supplying said liquid to the inlet of said first stage pump,
   means for delivering said liquid from the outlet of said first stage pump to the inlet of said second stage pump,
   means for supplying said gas to said second stage pump for mixing therein with said liquid,
   means for delivering said mixture of gas and liquid from said second stage pump to a dispenser, and
   recycle means for at least partially returning said mixture from said second stage pump, through a recycle passage to the inlet of said second stage pump when said dispenser is not dispensing all said mixture supplied to it from said second stage pump, the mixture recycled to said second stage pump bypassing the first stage pump.

2. The dispensing system of claim 1 in which said liquid is a molten hot melt adhesive and in which said gas is selected from the group consisting of nitrogen, carbon dioxide and air.

3. The dispensing system of claim 1 including
   valve means interposed in said recycle means, said valve means functioning to restrict recycle flow through said recycle means when said dispenser is dispensing all of the mixture supplied to it by said second pump.

4. The dispensing system of claim 3 wherein said recycle means includes a return line from said dispenser, said return line including a circulation valve.

5. The system of claim 1 wherein said recycle means includes a pressure operated valve responsive to the pressure of said mixture, for opening said recycle passage when said pressure exceeds a predetermined value.

6. The system of claim 1 wherein said recycle passage delivers the recycled mixture to the inlet of the first stage pump, at a position which is upstream in the direction of gear rotation, of the position at which said liquid is delivered to said inlet.

7. A dispensing system for mixing a gas with a liquid and for pumping the resulting mixture to a dispenser comprising,
   first and second stage gear pumps each having an inlet and outlet,
   a passage for supplying said liquid to the inlet of said first stage pump,
   means for delivering said liquid from the outlet of said first stage pump to the inlet of said second stage pump,
   means for supplying said gas to said second stage pump for mixing therein with said liquid,
   means for delivering said mixture of gas and liquid from said second stage pump to a dispenser, and
   recycle means for at least partially returning said mixture from said second stage pump, through a recycle passage to said second stage pump when said dispenser is not dispensing all said mixture supplied to it from said second stage pump,
   said recycle means connecting the outlet of said first stage pump with the inlet of said first stage pump, and connecting the outlet of said second stage pump with the inlet of said second stage pump, said liquid being recycled through said first pump and said mixture being recycled through said second pump.

8. The dispensing system of claim 7 including
   restrictor means interposed in said recycle means, said restrictor means functioning to restrict recycle flow to both said first and second pumps when said dispenser is dispensing all of the mixture supplied to it from said second pump.

9. The dispensing system of claim 8 wherein said restrictor means is variable, the variable restrictor means permitting an increased amount of recycle flow through said first and second pumps in response to decreased draw through said dispenser, and permitting a decreased amount of recycle flow through said first and second pumps in response to an increased draw through said dispenser.

10. The dispensing system of claim 9, said restrictor means comprising
    valve means adapted to close the inlet of said first pump to liquid supplied thereto, and adapted to close the inlet of said second pump from the outlet of said first pump, when none of said mixture is being discharged through said dispenser.

11. The dispensing system of claim 9, said restrictor means comprising
    a spool valve structure to cooperate with porting structure formed in part by pumping chambers of said first and second pumps, and
    bias means adapted to bias said spool valve to a full open position when the entire output from said second stage pump is being discharged through said dispenser, thereby closing said recycle means to recycle flow.

12. An improved hot melt adhesive foam pump system comprising
    a pump having an inlet and an outlet,
    means for supplying molten hot melt adhesive to the inlet of said pump,
    means for supplying gas from a gas source to said pump, said pump being operable to mix said gas and said molten adhesive and to force said gas into solution with said molten adhesive,
    means adapted to supply said solution of gas and molten adhesive from the outlet of said pump to the inlet of a selectively operable dispenser,
    recycle means for connecting the outlet of said pump with the inlet of said pump, said recycle means providing a path for recirculating said solution through said pump when said dispenser is not dispensing all of the solution supplied to it by said pump, and
    valve means interposed in said recycle means, said valve means functioning to restrict recycle flow through said pump when said dispenser is dispensing all of the solution supplied to it by said pump, said valve means increasing the rate of recycle flow through said pump as the rate of solution discharge through said dispenser decreases, and decreasing the rate of recycle flow through said pump as the rate of solution discharge through said dispenser increases,
    said valve means including a valve which closes the inlet of said pump to incoming molten hot melt adhesive when none of said solution is being discharged through said dispenser.

13. An improved hot melt adhesive foam pump system comprising
    a pump having an inlet and an outlet, means for supplying molten hot melt adhesive to the inlet of said pump, means for supplying gas from a gas source to said pump, said pump being operable to mix said gas and said molten adhesive and to force said gas into solution with said molten adhesive, means adapted to supply said solution of gas and molten adhesive from the outlet of said pump to the inlet of a selectively operable dispenser, recycle means for connecting the outlet of said pump with the inlet of said pump, said recycle means providing a path for recirculating said solution through said pump when said dispenser is not dispensing all of the solution supplied to it by said pump, and valve means interposed in said recycle means, said valve means functioning to restrict recycle flow through said pump when said dispenser is dispensing all of the solution supplied to it by said pump, said valve means increasing the rate of recycle flow through said pump as the rate of solution discharge through said dispenser decreases, and descreasing the rate of recycle flow through said pump as the rate of solution discharge through said dispenser increases, said valve means comprising a spool valve cooperable with porting in said pump and bias means urging said spool valve to a closed position restricting all recycle flow when all solution delivered by said pump is being discharged through said dispenser.

14. An improved hot melt adhesive foam dispensing system comprising a first stage metering pump and a second stage mixing gear pump, each said pump having an inlet and an outlet, means for driving both pumps at the same rate, means for supplying melted hot melt adhesive to the inlet of said first stage pump, a passage for delivering molten hot melt from the outlet of said first stage pump to the inlet of the second stage pump, means connectable to a gas source to supply gas from said gas source to the inlet of said second stage pump, said second stage pump being operable to mix said gas and said molten adhesive and to force said gas into solution in said molten adhesive, said second stage pump having a greater displacement than said first stage pump, said gas being supplied from said gas source to the inlet of said second stage pump at a position which is downstream in the direction of second stage pump gear rotation from the point at which molten hot melt adhesive is delivered to the inlet of the second stage pump from the first stage pump.

15. The improved system of claim 14 wherein the displacement of said second stage pump is in the range of about 1.25 to 2 times greater than that of the first stage pump.

16. The improved system of claim 14 wherein said second stage pump has gears which are at least 1.5 times thicker than the gears of the first stage pump, thereby to provide said greater displacement.

17. An improved hot melt adhesive foam dispensing system comprising a first stage metering pump and a second stage mixing pump, each said pump having an inlet and an outlet, means for driving both pumps at the same rate, means for supplying melted hot melt adhesive to the inlet of said first stage pump, a passage for delivering molten hot melt from the outlet of said first stage pump to the inlet of the second stage pump, means connectable to a gas source to supply gas from said gas source to the inlet of said second stage pump, said second stage pump being operable to mix said gas and said molten adhesive and to force said gas into solution in said molten adhesive, said second stage pump having a greater displacement than said first stage pump, and recycle means for recycling the output of said second stage pump back to inlet of said second stage pump and bypassing said first stage pump, and for recycling the output of said first stage pump back to the inlet of said first stage pump and bypassing said second stage pump.

18. An improved hot melt adhesive foam dispensing system comprising a first stage metering pump and a second stage mixing pump, each said pump having an inlet and an outlet, means for driving both pumps at the same rate, means for supplying melted hot melt adhesive to the inlet of said first stage pump, a passage for delivering molten hot melt from the outlet of said first stage pump to the inlet of the second stage pump, means connectable to a gas source to supply gas from said gas source to the inlet of said second stage pump, said second stage pump being operable to mix said gas and said molten adhesive and to force said gas into solution in said molten adhesive, said second stage pump having a greater displacement than said first stage pump, recycle means for recycling the output of said second stage pump back to the inlet of said second stage pump and bypassing said first stage pump, and for recycling the output of said first stage pump back to the inlet of said first stage pump and bypassing said second stage pump, said recycle means including a proportioning valve for maintaining the same proportion between the rate of recycle through the respective pumps to total flow therethrough.

19. A system for mixing a gas with a liquid and for pumping the resulting mixture to a dispenser, comprising a first stage metering pump and a second stage mixing pump each having an inlet and outlet, a passage for supplying said liquid to the inlet of said first stage pump, means for delivering said liquid from the outlet of said first stage pump to the inlet of said second stage pump, means for supplying said gas to said second stage pump for mixing therein with said liquid, means for delivering said mixture of gas and liquid from said second stage pump to a dispenser, and recycle means for returning said mixture to said second stage pump when said dispenser is not dispensing all said mixture supplied to it from said second stage pump, said recycle means including a pressure operated spool valve responsive to the pressure of said mixture at the outlet of said second stage pump, for opening a path to at least partially recycle said mixture to said second stage pump when said pressure exceeds a predetermined value.

20. The system of claim 19 wherein said first and second stage pumps are gear pumps which are in axial alignment with one another, said pumps being housed in a series of stacked plates with said first stage pump disposed above the second stage pump, and said valve is disposed in a bore in said plates which is parallel to but offset from the axis of said pumps.

* * * * *